(12) United States Patent
Welz et al.

(10) Patent No.: US 11,240,957 B2
(45) Date of Patent: Feb. 8, 2022

(54) MOWER DECK TRANSPORT LOCK

(71) Applicant: Deere & Company, Moline, IL (US)

(72) Inventors: Frank M. Welz, Beaver Dam, WI (US); Jose Antonio Gutierrez, Garza García (MX)

(73) Assignee: DEERE & COMPANY, Moline, IL (US)

( * ) Notice: Subject to any disclaimer, the term of this patent is extended or adjusted under 35 U.S.C. 154(b) by 864 days.

(21) Appl. No.: 16/015,183

(22) Filed: Jun. 21, 2018

(65) Prior Publication Data

US 2019/0387676 A1     Dec. 26, 2019

(51) Int. Cl.
| A01D 67/00 | (2006.01) |
| A01D 34/82 | (2006.01) |
| A01D 101/00 | (2006.01) |
| A01D 34/74 | (2006.01) |

(52) U.S. Cl.
CPC .............. *A01D 34/82* (2013.01); *A01D 34/74* (2013.01); *A01D 2101/00* (2013.01)

(58) Field of Classification Search
CPC ..... A01D 34/82; A01D 34/74; A01D 2101/00
USPC ............................................. 56/17.1, 320.1
See application file for complete search history.

(56) References Cited

U.S. PATENT DOCUMENTS

| 5,815,033 | A | 10/1998 | Busboom et al. |
| 6,122,903 | A | 9/2000 | Hayashi et al. |
| 6,427,430 | B1 | 8/2002 | Swartzendruber |
| 6,588,188 | B2 | 7/2003 | Dennis |
| 6,658,831 | B2 | 12/2003 | Velke et al. |
| 7,448,191 | B2 | 11/2008 | Elhardt et al. |
| 7,540,134 | B1 | 6/2009 | Reich |
| 7,578,117 | B2 | 8/2009 | Shaffer et al. |
| 7,614,207 | B2 | 11/2009 | Elhardt et al. |
| 9,288,940 | B2* | 3/2016 | Berglund ............... A01D 34/64 |
| 2002/0059788 | A1 | 5/2002 | Velke et al. |
| 2007/0271895 | A1* | 11/2007 | Nogami ................. A01D 34/82 56/17.1 |
| 2008/0229725 | A1* | 9/2008 | Shaffer .................. A01D 34/74 56/17.1 |
| 2014/0083069 | A1 | 3/2014 | Berglund |
| 2014/0260162 | A1* | 9/2014 | Lancaster ............. A01D 34/74 56/17.1 |

OTHER PUBLICATIONS

German Search Report issued in counterpart application No. 102019208792.2 dated Apr. 8, 2020 (10 pages).
Great Britain Search Report issued in counterpart application No. 1908347.6 dated Dec. 12, 2018. (3 pages).

* cited by examiner

*Primary Examiner* — Thomas B Will
*Assistant Examiner* — Mai T Nguyen

(57) ABSTRACT

A mower deck transport lock includes a striker bracket mounted to a rock shaft and extending downwardly and forwardly to engage a height of cut support at any of a plurality of height of cut positions. A transport lock pin positioned adjacent the height of cut support can slide between a first position and a second position. A spring biases the transport lock pin toward the first position and into engagement with the striker bracket to support the mower deck at a transport height above the plurality of height of cut positions. A transport lock disengagement pedal urges the transport lock pin to slide towards the second position to disengage the transport lock pin from the striker bracket.

15 Claims, 4 Drawing Sheets

MOWER DECK TRANSPORT LOCK

FIELD OF THE INVENTION

This invention relates generally to height adjustable mower cutting decks, and specifically to a mower deck transport lock to hold the mower deck at a transport height.

BACKGROUND OF THE INVENTION

Vegetation cutting implements such as mower cutting decks are typically carried by self-propelled vehicles or lawn tractors having mechanisms allowing adjustment of the decks between a range of heights above ground level. Ordinarily, the range extends between a position at or below the lowest available cut height to a position at or above the highest available cut height. Adjustment to a position below the cut height range is frequently preferred for ease in removal of the deck from the vehicle because the deck is that much closer to the ground surface. Adjustment above the cut height range may permit the deck to clear obstacles encountered while traveling across the ground. This maximum height position may be referred to as the deck transport height.

Adjustment of the cutting deck height may be accomplished by various mechanisms including hand-operated levers and bars positioned in the vicinity of the mower's operator station. The mechanisms require an operator to either push or pull on a lever or bar to adjust the deck height. Pedal actuated mechanisms also are used to adjust cutting deck height relative to the mower frame. Pedal actuated mechanisms may include a handle or other hardware which automatically locks the deck in a given position upon full actuation of the pedal.

Examples of mower deck transport locks are shown in U.S. Pat. Nos. 7,448,191 and 7,614,207. These patents relate to a transport lock crank which may be locked in a transport height preventing the height of cut pawl from engaging a height of cut cam, or unlocked to allow the height of cut pawl to engage the height of cut cam. A transport lock indicator integrated into the height of cut control knob is connected to the transport lock crank, and is movable with the transport lock between the transport height and an unlocked position. Another example is U.S. Pat. No. 9,288,940 which relates to a transport lock assembly that automatically engages when the deck is lifted to a clearance height. The transport lock is biased into a locking position, and engages a surface of a deck prop that is also used in the height of cut assembly. A transport lock actuator is used to disengage the transport lock, and also includes a disabling mechanism that prevents the transport lock from automatically engaging. Another example is U.S. Pat. No. 7,578,117 which relates to a deck lift mechanism with a first pedal connected to a lift linkage, and a second pedal to automatically latch the mower deck into a raised transport height when the first pedal is depressed a preset amount, and to unlatch the mower deck upon actuation by the operator's foot.

A mower deck transport lock is needed that is low cost, light weight and requires minimal assembly time. A mower deck transport lock is needed that may be engaged and/or disengaged without the operator removing his hands from the control levers or steering wheel. A mower deck transport lock is needed that may be bypassed when the deck is fully raised and the operator decides not to engage the transport lock.

SUMMARY OF THE INVENTION

A mower deck transport lock includes a striker bracket engaging a height of cut stop having a plurality of height of cut positions. A transport lock pin is located adjacent the height of cut stop. The striker bracket engages the transport lock pin at a transport lock position above the plurality of height of cut positions. A transport lock disengagement pedal disengages the transport lock pin from the striker bracket.

The mower deck transport lock is low cost, light weight and requires minimal assembly time. The mower deck transport lock may be engaged and/or disengaged without the operator removing his hands from the control levers or steering wheel. The mower deck transport lock may be bypassed when the deck is fully raised and the operator chooses not to engage the transport lock.

DESCRIPTION OF THE PREFERRED EMBODIMENT

Figure 1:
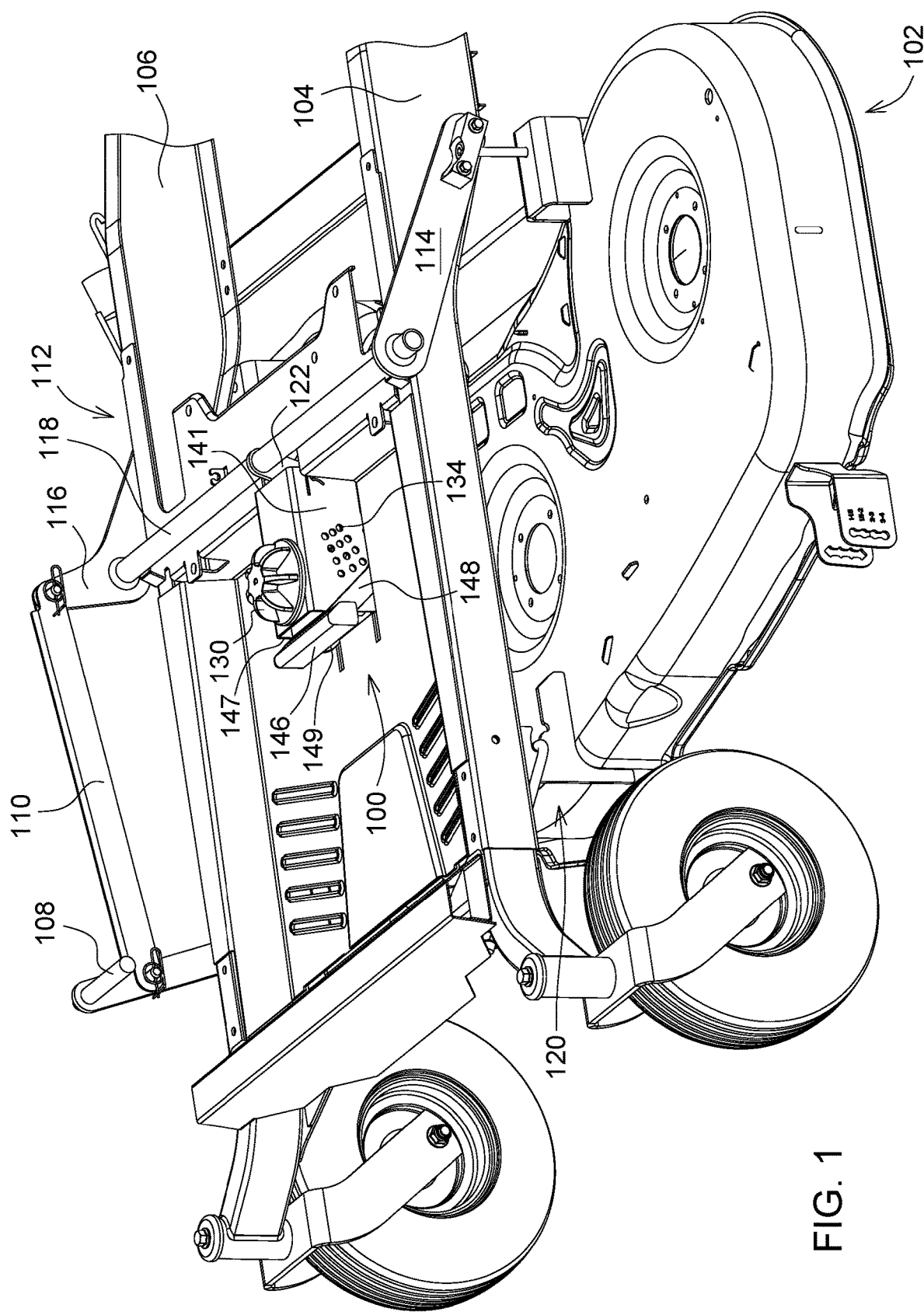
FIG. 1 is a perspective view of a mower deck with a mower deck transport lock according to a first embodiment of the invention.

In one embodiment shown in FIGS. 1-4, mower deck transport lock 100 may be provided on mower deck 102. The mower deck may be mounted under the frame of a self-propelled vehicle such as a lawn tractor or zero turning radius mower. For example, the frame may include a pair of longitudinal frame members 104, 106. The mower deck may cover at least 2 or 3 rotary mower blades and may include a side or rear discharge chute for collection of grass clippings.

In one embodiment, mower deck transport lock 100 may be used on a mower deck having a height of cut system with a parallelogram linkage to adjust the vertical position of the deck relative to the frame. For example, the mower deck may be raised and lowered with deck lift pedal 108 and rockshaft weldment 112. The deck lift pedal may be pivotably connected to the rockshaft weldment through link 110 which may extend rearwardly between the lift pedal and one of mower deck rear lift arms 114, 116. The rockshaft weldment may include rockshaft cross member 118 which may be pivotably mounted to frame members 104, 106, and may connect between left and right mower deck rear lift arms 114, 116. The lower end of each rear lift arm may be pivotably connected to the top rear surface of the mower deck. The deck lift pedal also may be pivotably connected to front lift linkage 120 to raise and lower the front of the mower deck. Alternatively, the mower deck transport lock may be used on a mower deck that may be raised and lowered with a hand lever instead of a foot pedal.

Figure 3:
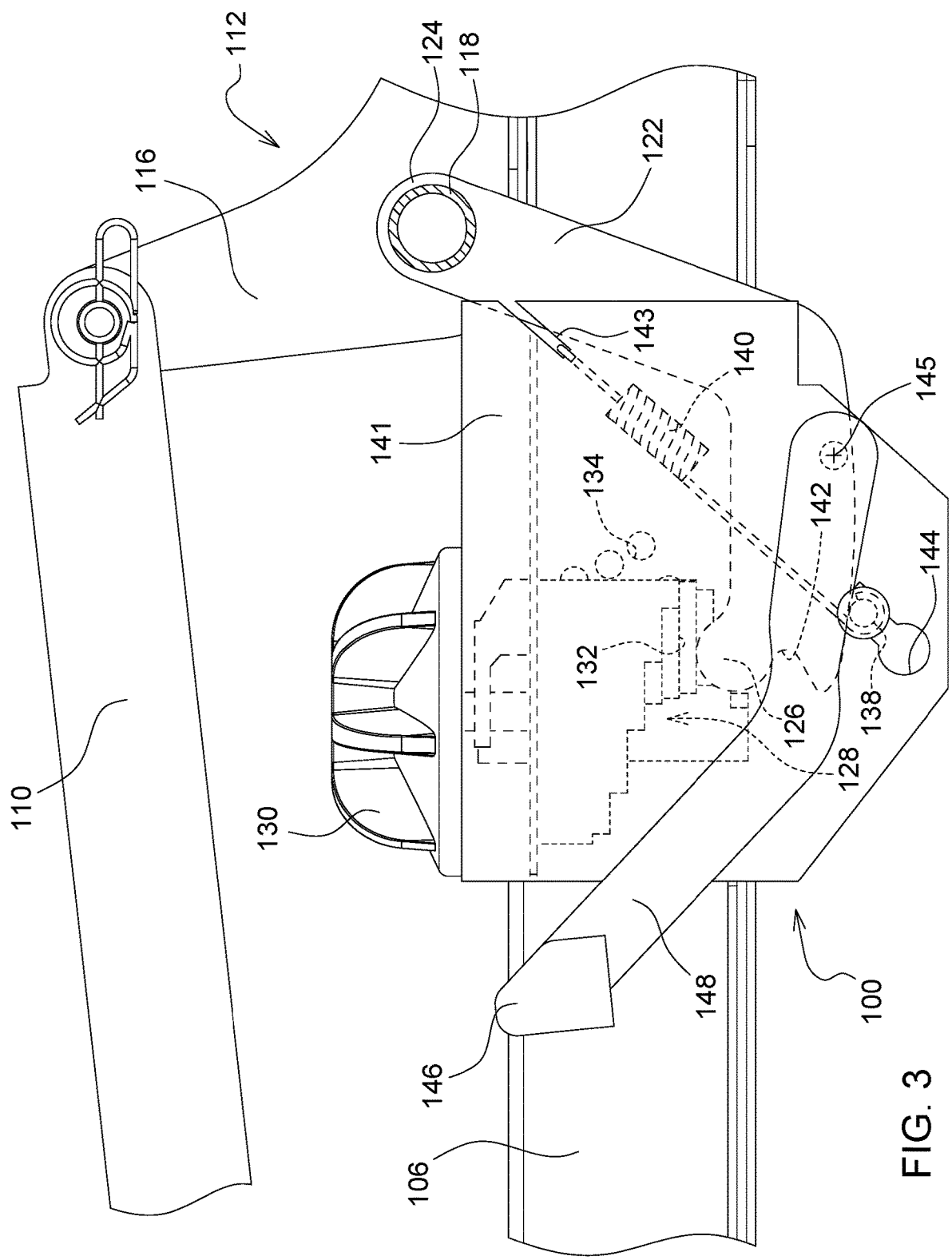
FIG. 3 is a side view, partially in cross section, of a mower deck transport lock that is disengaged while the mower deck is supported at a selected cutting height, according to a first embodiment of the invention.

In one embodiment, mower deck transport lock 100 may include striker bracket 122 that may be used to engage a height of cut stop at each of a plurality of height of cut positions. The striker bracket may pivot with rockshaft cross member 118 as deck lift pedal 108 is depressed or released. When the deck lift pedal is depressed, the striker bracket may be raised off height of cut stop 128, and when the deck lift pedal is released, the striker bracket may engage height of cut stop 128. For example, the striker bracket may be an L-shaped sheet metal component with first or upper end 124 welded to rockshaft cross member 118 between left and right mower deck rear lift arms 114, 116, and second or lower end 126 that may extend forwardly to engage height of cut stop 128. The height of cut stop may be a pivoting member that the operator may rotate using height of cut knob 130 to adjust the mowing height. For example, the height of cut stop may have a spiral surface with a plurality of steps 132, with each step corresponding to a different height of cut. As shown in FIG. 3, the second or lower end 126 of the striker bracket may contact and engage any one of the steps 132 on the height of cut stop when the operator releases deck lift pedal 108, holding the rockshaft and mower deck at the selected height of cut. Various other height of cut stops may be used with the mower deck transport lock of the present invention, such as a height of cut stop with a setscrew or a rod or clip instead of a stepped spiral surface. For example, the second or lower end of the striker bracket may engage a height of cut stop in the form of a rod or clip inserted into any of holes 134 through plates 141 and 147.

Figure 2:
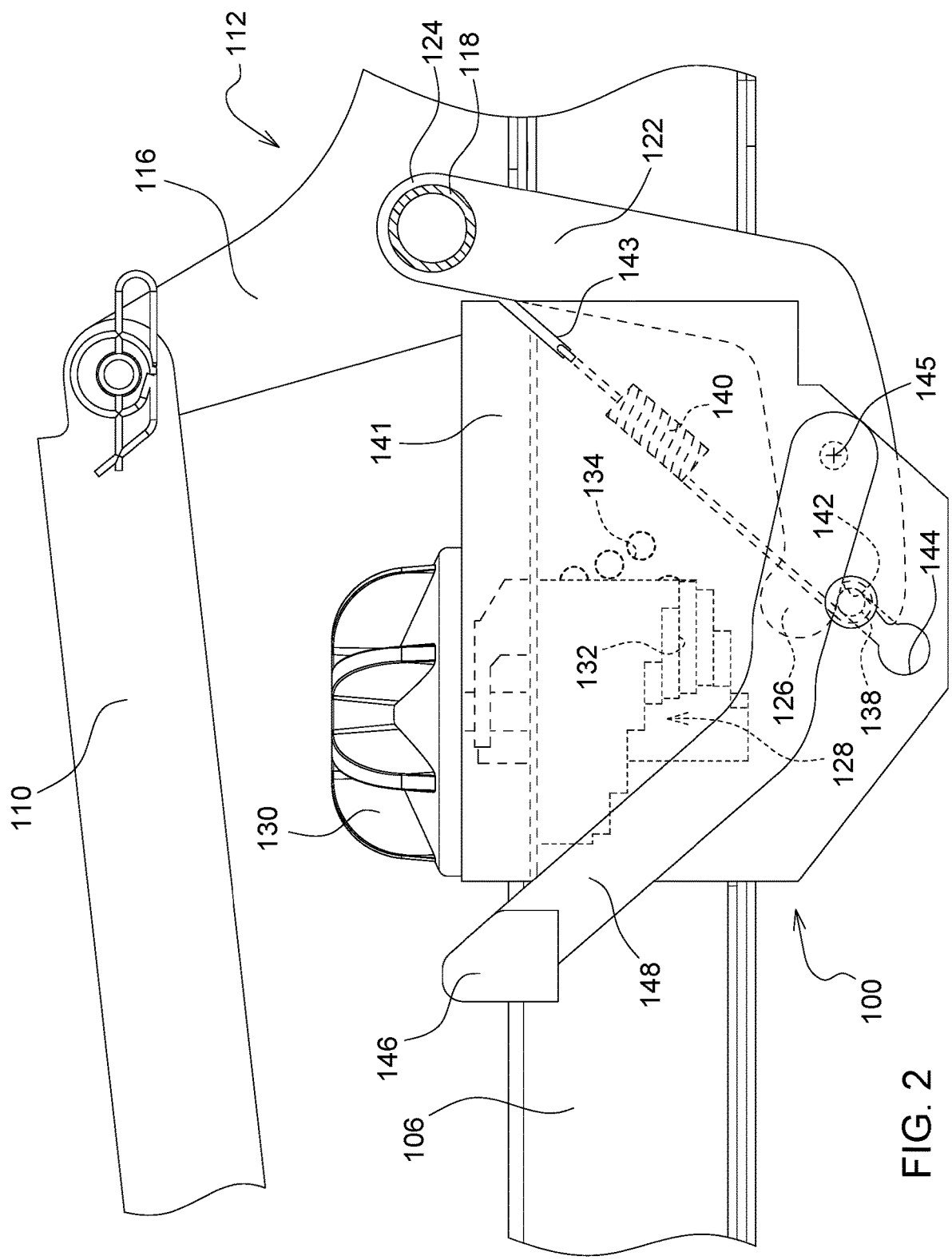
FIG. 2 is a side view, of a mower deck transport lock that is engaged at a transport height, according to a first embodiment of the invention.

In one embodiment, as shown in FIG. 2, mower deck transport lock 100 may include striker bracket 122 that engages transport lock pin 138 in the transport lock position. In the transport lock position, the mower deck may be above the height of cut positions. However, as the mower deck is raised to the maximum height at the transport lock position, the striker bracket may pivot below the height of cut stop. To move the striker bracket into engagement with the transport lock pin, the operator may depress deck lift pedal 108 to pivot the striker bracket to its lowest point below the height of cut stop. Transport lock pin 138 may extend out from slot 144 in plate 141. Transport lock pin 138 may slide between a first position at a first or upper end of slot 144 that may be located closer to the axis of rockshaft cross member 118, and a second position at a second or lower end of slot 144 which may be located further away from the axis of rockshaft cross member. Transport lock spring 140 may bias transport lock pin 138 to slide towards the first position or upper end of slot 144. For example, transport lock spring may be connected between transport lock pin 138 and slot 143 in either of plates 141 or 147. As a result, the transport lock spring may bias the transport lock pin towards engagement with striker bracket 122, and to maintain contact with the striker bracket at the transport height.

In one embodiment, mower deck transport lock 100 may include striker bracket 122 having cam surface 142 and a generally V-shaped depression adjacent the cam surface. Transport lock spring 140 may urge transport lock pin 138 toward the center of the V-shaped depression. The V-shaped depression may help keep the transport lock engaged.

Figure 4:
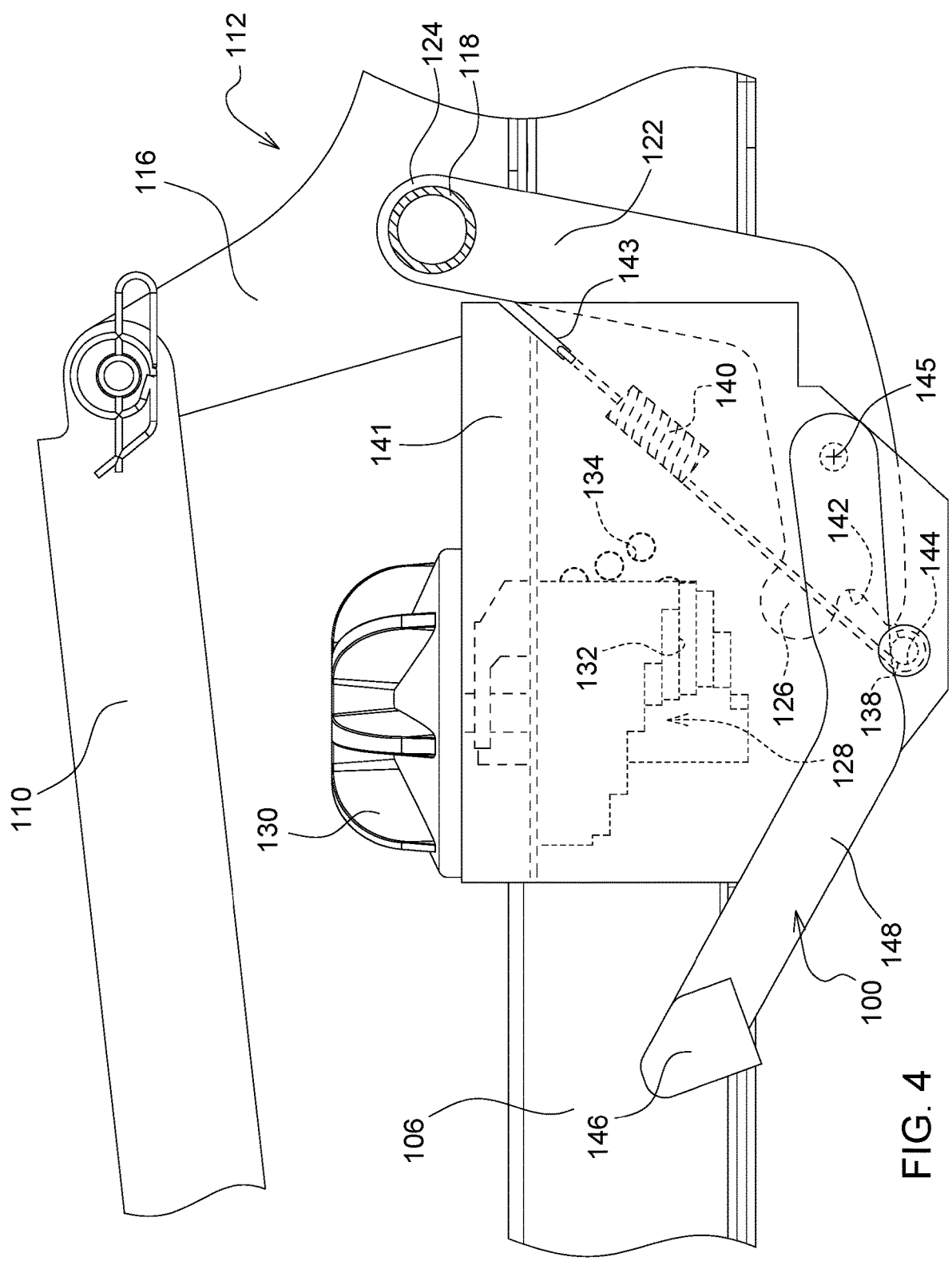
FIG. 4 is a side view, partially in cross section, of a mower deck transport lock that is disengaged by the transport lock disengagement pedal, according to a first embodiment of the invention.

In one embodiment, mower deck transport lock 100 may include transport lock disengagement pedal 146. The transport lock disengagement pedal may include support arms 148 and 149 which may be pivotably mounted at axis 145 to plates 141 and 147. As shown in FIG. 4, the transport lock disengagement pedal may be used to disengage the transport lock, and to prevent engagement of the transport lock when the deck is raised above the height of cut positions. For example, the transport lock disengagement pedal may allow the operator to prevent engagement of the transport lock when raising the mower deck briefly over obstacles. The operator should depress the deck lift peal before depressing the transport lock disengagement pedal, so that the deck lift pedal may carry the weight of the mower deck. The transport lock disengagement pedal may be biased by the transport lock spring 140 to a non-depressed position. The transport lock disengagement pedal also may be used to disengage the striker bracket from the transport lock pin. When the transport lock disengagement pedal is depressed against the tension force of spring 140, support arms 148, 149 may contact transport lock pin 138, or may contact a bushing or other structure attached to the transport lock pin. As shown in FIG. 4, the support arms may push the transport lock pin to slide down toward the second position or lower end of slot 144, and disengage the transport lock pin from striker bracket 122.

Having described the preferred embodiments, it will become apparent that various modifications can be made without departing from the scope of the invention as defined in the accompanying claims.

The invention claimed is:

1. A mower deck transport lock, comprising
   a striker bracket engaging a height of cut stop having a plurality of height of cut positions;
   a transport lock pin adjacent the height of cut stop; the striker bracket engaging the transport lock pin at a transport lock position above the plurality of height of cut positions; and
   a transport lock disengagement pedal depressible for disengaging the transport lock pin from the striker bracket and for preventing engagement of the transport lock pin with the striker bracket.

2. The mower deck transport lock of claim 1 wherein the transport lock pin slides between a first position where the transport lock pin may be engaged by the striker bracket, and a second position where the transport lock pin is disengaged from the striker bracket.

3. The mower deck transport lock of claim 2 further comprising a spring biasing the transport lock pin towards the first position.

4. The mower deck transport lock of claim 2 wherein the transport lock disengagement pedal may move the transport lock pin to the second position.

5. The mower deck transport lock of claim 1 wherein the striker bracket has a cam surface that contacts the transport lock pin.

6. The mower deck transport lock of claim 1 wherein the height of cut stop has a spiral surface with a plurality of steps that the striker bracket contacts.

7. A mower deck transport lock, comprising:
   a striker bracket mounted to a rock shaft to engage a height of cut support at any of a plurality of height of cut positions;
   a transport lock pin positioned adjacent the height of cut support and sliding between a first position and a second position;
   a spring biasing the transport lock pin toward the first position and into engagement with the striker bracket to support the mower deck at a transport height above the plurality of height of cut positions; and
   a transport lock disengagement pedal having a depressed position for moving the transport lock pin to slide towards the second position to disengage the transport lock pin from the striker bracket and for holding the transport lock pin in the second position when the deck is raised above the plurality of height of cut positions.

8. The mower deck transport lock of claim 7 wherein the transport lock disengagement pedal includes support arms that contact the transport lock pin.

9. The mower deck transport lock of claim 7 wherein the striker bracket includes a cam surface with a V-shaped depression, and the spring biases the transport lock pin toward a center of the V-shaped depression.

10. The mower deck transport lock of claim 7 wherein the height of cut support includes a plurality of steps on a spiral surface.

11. The mower deck transport lock of claim 7 further comprising a deck lift pedal pivoting the rock shaft and disengaging the striker bracket from the height of cut support.

12. A mower deck transport lock, comprising:
a transport lock pin moveable between a first position and a second position;
the transport lock pin engaged by a striker bracket to support a mower deck at a transport height only when the transport lock pin is at the first position; and
a transport lock disengagement pedal moveable to push the transport lock pin to the second position;
wherein the first position and the second position are a first end and a second end of a slot.

13. The mower deck transport lock of claim 12 further comprising a spring biasing the transport lock to the first position.

14. The mower deck transport lock of claim 12 wherein the striker bracket has a cam surface engaging the transport lock pin.

15. The mower deck transport lock of claim 12 wherein the striker bracket is engageable with a spiral height of cut support to hold the mower deck at any of a plurality of cutting heights below the transport height.

* * * * *